US008654005B2

(12) United States Patent
Christopher et al.

(10) Patent No.: US 8,654,005 B2
(45) Date of Patent: Feb. 18, 2014

(54) METHODS FOR RESOLVING RADAR AMBIGUITIES USING MULTIPLE HYPOTHESIS TRACKING

(75) Inventors: Keian Christopher, Seattle, WA (US); Samuel S. Blackman, Los Angeles, CA (US); Robert A. Rosen, Agoura Hills, CA (US); Robert J. Dempster, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 298 days.

(21) Appl. No.: 13/274,249

(22) Filed: Oct. 14, 2011

(65) Prior Publication Data

US 2013/0093617 A1    Apr. 18, 2013

(51) Int. Cl.
*G01S 13/66*    (2006.01)

(52) U.S. Cl.
USPC ............. 342/95; 342/137; 342/146; 342/158; 342/162

(58) Field of Classification Search
USPC ................. 342/16–17, 95–97, 137, 146–147, 342/157–159, 162, 195
See application file for complete search history.

(56) References Cited

U.S. PATENT DOCUMENTS

| 5,414,643 | A | | 5/1995 | Blackman et al. | |
|---|---|---|---|---|---|
| 5,798,942 | A | * | 8/1998 | Danchick et al. | 342/96 |
| 5,909,189 | A | * | 6/1999 | Blackman et al. | 342/90 |
| 6,078,281 | A | | 6/2000 | Milkovich et al. | |
| 6,225,943 | B1 | | 5/2001 | Curley et al. | |
| 6,677,900 | B1 | | 1/2004 | Thouvenel et al. | |
| 6,710,743 | B2 | * | 3/2004 | Benner et al. | 342/453 |
| 7,626,538 | B2 | * | 12/2009 | Rose | 342/195 |
| 8,134,493 | B2 | * | 3/2012 | Noble et al. | 342/107 |
| 2006/0238407 | A1 | * | 10/2006 | Bourdelais et al. | 342/90 |
| 2007/0211917 | A1 | * | 9/2007 | Nakano et al. | 382/103 |
| 2009/0312985 | A1 | | 12/2009 | Eliazar | |
| 2011/0260908 | A1 | * | 10/2011 | New et al. | 342/59 |
| 2011/0298650 | A1 | * | 12/2011 | Yapa et al. | 342/118 |
| 2012/0233098 | A1 | * | 9/2012 | Schwoegler et al. | 706/12 |
| 2013/0093617 | A1 | * | 4/2013 | Christopher et al. | 342/146 |

FOREIGN PATENT DOCUMENTS

WO    WO 99/31525    6/1999

OTHER PUBLICATIONS

M. A. Bell and R. A. Grubbs, "JEM Modeling and Measurement for Radar Target Identification", *IEEE Trans Aerospace and Electronic Systems*, vol. 29, No. 1, Jan. 1993 (pp. 73-87).
S. Blackman et al., "IMM/MHT Solution to Radar Benchmark Tracking Problem", *IEEE Trans. on Aerospace and Electronic Systems*, vol. 35, No. 2, Apr. 1999 (pp. 730-738).

(Continued)

*Primary Examiner* — John B Sotomayor
(74) *Attorney, Agent, or Firm* — Christie, Parker & Hale, LLP

(57) ABSTRACT

Methods for resolving radar ambiguities using multiple hypothesis tracking are described. One such method includes (a) choosing a single waveform for each of a plurality of dwells of a first scan, wherein the single waveforms of consecutive scans are different, (b) generating the first scan using the single waveform for each of the dwells of the first scan, (c) receiving observation data as a result of the first scan, the observation data comprising measured positions of true targets and false targets, (d) generating, using multiple hypothesis tracking, position predictions for true targets and false targets, (e) comparing the predicted positions and measured positions, repeating (a)-(e) until a preselected process condition is met, and determining the true targets based on the results of the comparisons.

9 Claims, 3 Drawing Sheets

(56) References Cited

OTHER PUBLICATIONS

Wang Feixing et al, "Method for Resolving the Range Ambiguity for High PRF Stepped-Frequency Radar", *Proc. of IEEE 2006 Radar Conference*, Oct. 2006, (pp. 1-4).

G. V. Trunk and M. W. Kim, "Ambiguity Resolution of Multiple Targets Using Pulse-Doppler Waveforms", *IEEE Trans. on Aerospace and Electronic Systems*, vol. 30, No. 4, Oct. 1994 (pp. 1130-1137).

Blackman, "Multiple Hypothesis Tracking for Multiple Target Tracking", *IEEE A&E Systems Magazine*, vol. 19, No, 1, Jan. 2004, Part 2: Tutorials-Blackman (pp. 5-18).

S. Immediata et al,, "New Approach to 2D Medium PRF Ambiguity Resolution With Application to Air Surveillance Radar", *Proc. of IEEE 2008 Radar Conf.* (pp. 1-4).

Wei Zhang et al., "An Algorithm of Resolving the Range Ambiguity Using a Single PRF", *Proc. of International Conference on Communications, Circuits and Systems* (ICCCAS) 2010 (pp. 444-448).

Wintenby, et al. "Probability Evaluation in MHT with a Product Set Representation of Hypotheses," 2006 9th International Conference on Information Fusion, Fusion, Inst. of Elec. and Elec. Eng. Computer Society US, IEEE, Jul. 1, 2006 (7 pgs.).

European Search Report dated Jan. 22, 2013 for European Application No. EP 12188343.3 in the name of Raytheon Company, European Search Report mailed Jan. 30, 2013 (7 pgs.).

\* cited by examiner

METHODS FOR RESOLVING RADAR AMBIGUITIES USING MULTIPLE HYPOTHESIS TRACKING

STATEMENT REGARDING FEDERALLY SPONSORED RESEARCH

This invention disclosure is related to Government contract number N68936-05-D-0033 T.O. 0012. The U.S. Government has certain rights in this invention.

FIELD

The present invention relates to radar systems, and more specifically to methods for resolving radar ambiguities using multiple hypothesis tracking.

BACKGROUND

Ambiguities in range and/or Doppler are typically inherent in a returning radar signal. Also, the radar environment may contain spurious range and range rate measurements due to Enemy Countermeasures (ECM) and/or spurious range rate measurements due to Jet Engine Modulation (JEM). In order to resolve signal processing ambiguities, a standard approach is to transmit multiple radar waveforms (multiple pulse repetition frequency or PRF) during a given dwell.

A major classification of waveforms deals with ambiguity resolution in range and Doppler. Low-PRF waveforms are generally unambiguous in range but ambiguous in Doppler, medium-PRF waveforms are ambiguous in both range and Doppler, and high-PRF waveforms are ambiguous in range but unambiguous in Doppler. Previous techniques, such as the Chinese Remainder Theorem, the Hovanessian algorithm, and clustering algorithms, have been developed for resolving the range and Doppler ambiguities of a single target for both medium-PRF and high-PRF waveforms. However, each of these conventional approaches can result in intensive radar processing per dwell and inefficient allocation of radar resources. As such, improved methods for resolving radar ambiguities are needed.

SUMMARY

Aspects of the invention relate to methods for resolving radar ambiguities using multiple hypothesis tracking. In one embodiment, the invention relates to a method for resolving radar ambiguity using multiple hypothesis tracking, the method comprising (a) choosing a single waveform for each of a plurality of dwells of a first scan, wherein the single waveforms of consecutive scans are different, (b) generating the first scan using the single waveform for each of the dwells of the first scan, (c) receiving observation data as a result of the first scan, the observation data comprising measured positions of true targets and false targets, (d) generating, using multiple hypothesis tracking, position predictions for true targets and false targets, (e) comparing the predicted positions and measured positions, repeating (a)-(e) until a preselected process condition is met, and determining the true targets based on the results of the comparisons.

DETAILED DESCRIPTION

Figure 1:
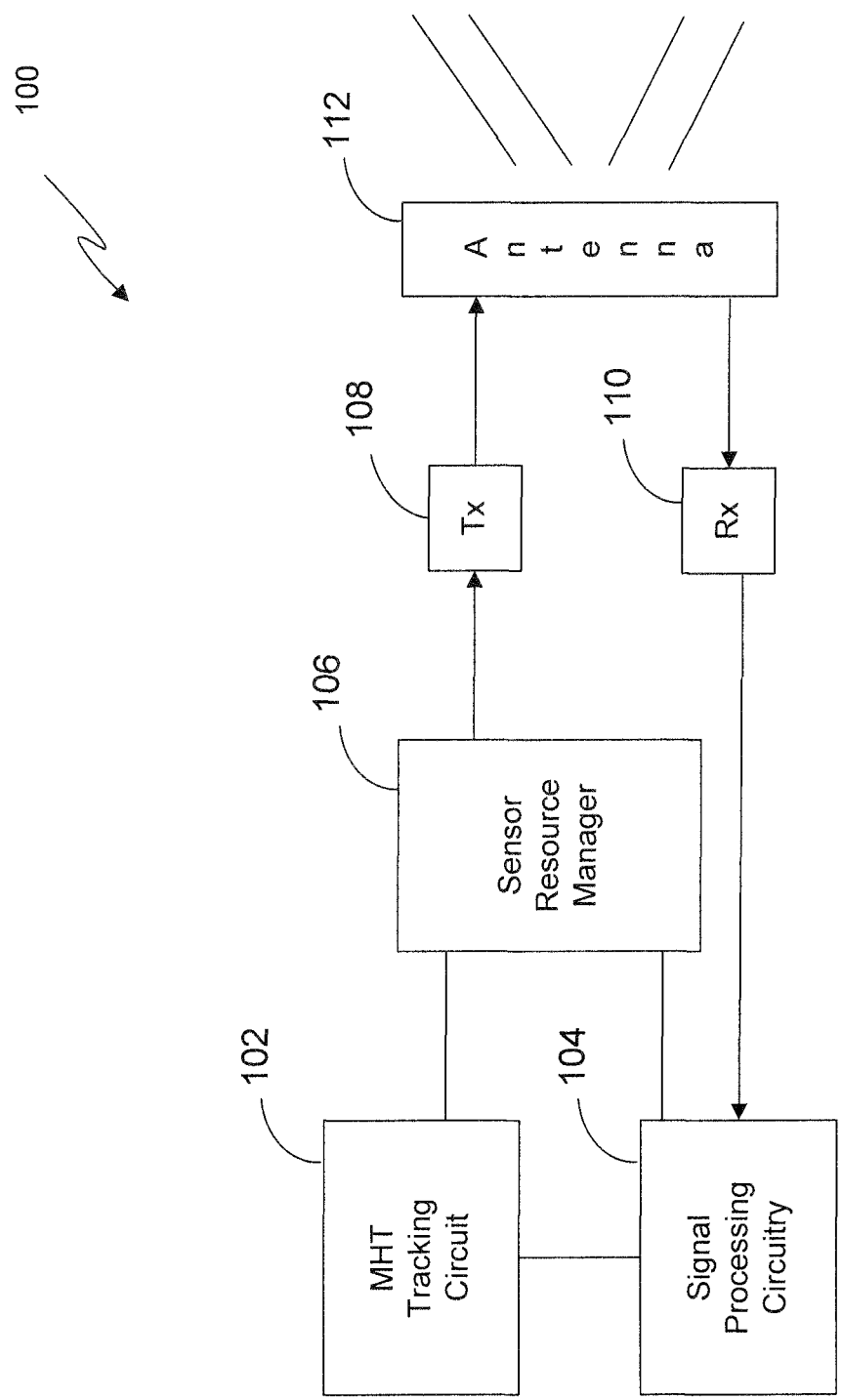
FIG. 1 is a schematic block diagram of a radar system for resolving radar ambiguities using multiple hypothesis tracking in accordance with one embodiment of the invention.

Referring now to the drawings, embodiments of processes for resolving radar ambiguities using multiple hypothesis tracking (MHT) are illustrated. The processes use a single waveform per each scan and an alternating set of waveforms over multiple scans. These processes then initiate multiple track hypotheses on a given dwell to represent the potential target positions resulting from the radar range and Doppler ambiguities and then resolve the ambiguities over time through MHT processing. Within the MHT structure these tracks are incompatible, and thus after MHT processing of subsequent scans of data, there can be at most one track that is determined to represent the true target. However, special processing, described below, is often required in order to ensure that combinatorial problems do not arise before the ambiguity can be resolved. One advantage of the proposed method is that more time on target per pulse repetition frequency (PRF) per dwell is allowed.

The Radar Ambiguity Problem:

To understand the processes for resolving radar ambiguities using multiple hypothesis tracking (MHT), it helps to consider the radar ambiguity problem in greater depth. The most common form of radar ambiguities occur in measured range and range rate as a function of the transmitted waveform. Depending upon the choice of pulse repetition frequency (PRF) there may be ambiguities in range, in Doppler (range rate) or in both. The result is that there will be an ambiguous set of potential measurements of which at most one will correctly represent a true target. As the PRFs are changed the true target range and range rate will be present for all PRFs that detect the target but the other members of the ambiguous set will differ with the PRF. Thus, as discussed in various radar literature, a conventional approach is to transmit multiple PRFs and to identify the common measured range and range rate as representing a true target. However, this process is further complicated by the potential presence of multiple targets that make the solution to the problem of finding the correct measurements require complex logic. The number of PRFs (NPRF) used is typically in the range of 3 to 7.

Using a conventional approach, multiple PRFs are transmitted on the same dwell so that the total time-on-target (TOT) for a given dwell is split into different segments for each of the PRFs. Thus, since the target signal-to-noise ratio (SNR) is proportional to TOT, the SNR for each look with a different PRF is reduced by the factor (1/NPRF) from the value of SNR that would be obtained if a single PRF were used during the entire dwell. Further, for a detection to be declared for the dwell, there must be detections on M out of N (M/N criterion) of the multiple PRFs with typical detection requirements being 3/3 or 5/7, etc. Thus, multiple detections on different PRFs with a reduced SNR are required and complex logic is required to sort out these PRF detections so that at most a single detection is output on a given dwell for a target.

Other common sources of ambiguous radar measurements include JEM and ECM as discussed briefly in the Background section above. JEM returns are the result of the jet engine (turbine) or propeller modulation on the radar return that can lead to multiple apparent range rate detections from a single target. The ambiguous set of JEM returns can typically be identified from their common measured range and angle but the spurious range rates may be falsely interpreted as indicating a target maneuver. An additional problem in the presence of JEM is that there may be JEM returns without the true target (skin) return being present. ECM returns result from the attempt by the enemy to spoof the tracking system by intercepting the transmitted radar signal and returning bogus perturbed copies of it.

Although not well documented, it appears that ad hoc approaches are used to counter the effects of JEM and ECM. For example, a common method for countering JEM is to propagate two sets of tracking filters. One filter would use range rate and the other would not. Then, a divergence test is performed to determine if the filter that used range rate had been deceived and if so the solution that ignored range rate is used. However, using this approach the solution that used the correct range rate may have been lost.

Resolving the Radar Ambiguity Problem Using MHT:

The proposed approach for addressing the signal processing radar ambiguity problem is to pass all members of an ambiguous set to an MHT tracker and to then have the tracker resolve the ambiguities over time. The deferred decision nature of the MHT is well suited for this application and the track-oriented MHT is readily applied. All tracks that are initiated or updated with observations from the ambiguity set are defined to be incompatible. Tracks are defined to be incompatible if they contain one or more common observations. Thus, under the assumption that a target produces at most a single observation per dwell, at most one of the incompatible tracks can represent a true target. Then, after the subsequent MHT processing steps of scoring, hypothesis formation, probability calculation and pruning/deletion at most one of these tracks will ultimately be declared to represent a true target. A decision window of 4 to 6 scans with updating observations is used to ensure final irrevocable decisions are made in a timely manner but experience has shown that typically only 2 or at most 3 observations are required to resolve the ambiguity. However, in order for a final ambiguity resolution decision to be made, the final chosen track should satisfy the confirmation criteria and also have updates from more than one PRF. A track is generally confirmed once the likelihood ratio that the hypothesis that the track contains observations from a single source to the likelihood of the hypothesis that the observations in the track are from unrelated sources exceeds a predetermined threshold. This threshold is typically defined by the system's allowable false track rate (e.g., such as one per hour).

Hypothesis formation is typically a very time-consuming function in an MHT tracker and the proposed approach has the potential to greatly increase the time required by hypothesis formation. Thus, one simplification that has been found to reduce computation time is to not send all new (not updated) tracks to hypothesis formation. Since all initial tracks represent the hypothesis that the observation is from a new source, only one of the tracks is chosen to represent all tracks initiated by measurements in the ambiguity set in hypothesis formation and in the subsequent probability calculations. Since all tracks in the ambiguity set will have the same probability, the choice of track is arbitrary. Then, if the decision, based upon computed probability, is made to delete the representative track, all tracks initiated by members of the ambiguity set are deleted. This occurs, for example, when the probability that the observation in question associates with an existing track is very high.

FIG. 1 is a schematic block diagram of a radar system 100 for resolving radar ambiguities using multiple hypothesis tracking in accordance with one embodiment of the invention. The radar system 100 includes MHT tracking circuitry 102 coupled to signal processing circuitry 104 and a sensor resource manager 106. The sensor resource manager 106 is coupled to transmit circuitry 108 and the signal processing circuitry 104 is coupled to the receive circuitry 110. The transmit circuitry 108 and the receive circuitry 110 are each coupled to a radar antenna 112.

In operation, the sensor manager 106 can choose a different wave form for each scan. This choice may be determined by some a priori defined schedule or may be chosen adaptively from the track data. The main point is that, in general, there will be different waveforms chosen for consecutive scans so that the false ambiguous radar returns will differ from scan to scan while the true target returns will be consistent from scan to scan.

For example, in some embodiments, for an MPRF radar, 3 to 7 differing PRF values would be chosen to allow ambiguity resolution and to ensure that the target will be in a clear region to avoid being eclipsed. Eclipsing occurs when the target return would be received at the time that the radar is transmitting and thus has its receiver turned off. Having an estimate of target position will lead to a better choice of PRF to avoid eclipsing.

The radar transmitter 108 can transmit power (e.g., selected waveforms provided by sensor manager 106) and the receiver 110 will receive returning power from true targets as well as extraneous objects such as clutter (e.g., false targets). This returning signal data will be sent to signal processing 104.

The radar signal processor 104 can analyze the data to determine the location of potential targets. Typically, based upon the returns from a single wave form it will not be possible to determine the exact location of a potential target. Rather, there will be an ambiguous set of possible target locations and range rates that all represent feasible target positions and radial velocities. Although the correct measurement in the set cannot be determined the set of potential measurements that represents at most a single target can be identified. This set is tagged and sent to the MHT tracker 102 to resolve using data from later scans.

At the MHT tracking circuitry 102, gating and scoring can be performed. For example, new measurements are compared with the predictions of previously (on past scans) formed tracks. Gating is used to determine feasible observation-to-track associations, and the goodness of fit between the measurements and the track predictions is used to score the branch tracks that are formed by updating a prior track with a new measurement. Goodness of fit can be defined by a track score that measures the consistency of the observations in a track with previously defined mathematical models for target dynamics and measurement quality. In this step, the predicted positions of the tracks formed from incorrect ambiguous measurements will typically not correspond with the measurements obtained from the use of a different wave form. However, the tracks formed on correct prior measurements will typically be associated with new measurements that represent true target positions. This will be reflected in the track scores that will later be converted to probabilities. New tracks are also initiated upon all measurements under the hypothesis that a previously untracked target has been newly detected.

At the MHT tracking circuitry 102, hypothesis forming and track probability calculation are performed. For example, all tracks that were initiated or updated by measurements that are in the same ambiguity set can be defined to be incompatible.

Then, hypotheses can be formed by collecting compatible tracks into hypotheses and computing the probabilities of those hypotheses. Track probabilities are then computed from the hypothesis probabilities. Tracks whose probabilities fall below a deletion threshold can be deleted, and, subject to further tests that are required to maintain computational feasibility, the remaining tracks are propagated to the next dwell. Since incompatible tracks cannot be contained in the same hypothesis, the members of ambiguity sets will, in effect, be competing for probability.

As an aside on the concept of competing for probability, hypotheses are collections of tracks and the hypothesis probabilities are computed as described above and in the art. A track's probability is the sum of the probabilities of the hypotheses that contain it. The members of an ambiguity set will all be in different hypotheses and the sum of their probabilities can be no greater than unity. Thus, track probabilities will be determined by the quality of the hypotheses that contain them so that the track's are, in effect, competing to be in the best (highest probability) hypotheses.

Then, eventually at most one member of an ambiguity set will be contained in any track that is continued. Once the ambiguity is resolved and a track passes a confirmation probability threshold, the track can be presented to the user. Track confirmation is an application of the classical Sequential Probability Ration Test (SPRT) whereby the threshold value is chosen in order to satisfy a false acceptance requirement. Specifically for this application of the SPRT, the confirmation threshold is computed from input rate of observations and a user specified false track confirmation rate.

Also at the MHT tracking circuitry 102, track prediction is performed. For example, all remaining tracks can be predicted to the time of the next set of measurement data. This will generally include both tracks that are resolved and those that need further data for resolution. These predicted tracks are compared with the next set of measurement data and the process continues. These tracks may also be used by the sensor manager to point the sensor to the most likely target positions and to choose the waveform that will most likely produce target detections and best resolve current ambiguities.

Figure 2:
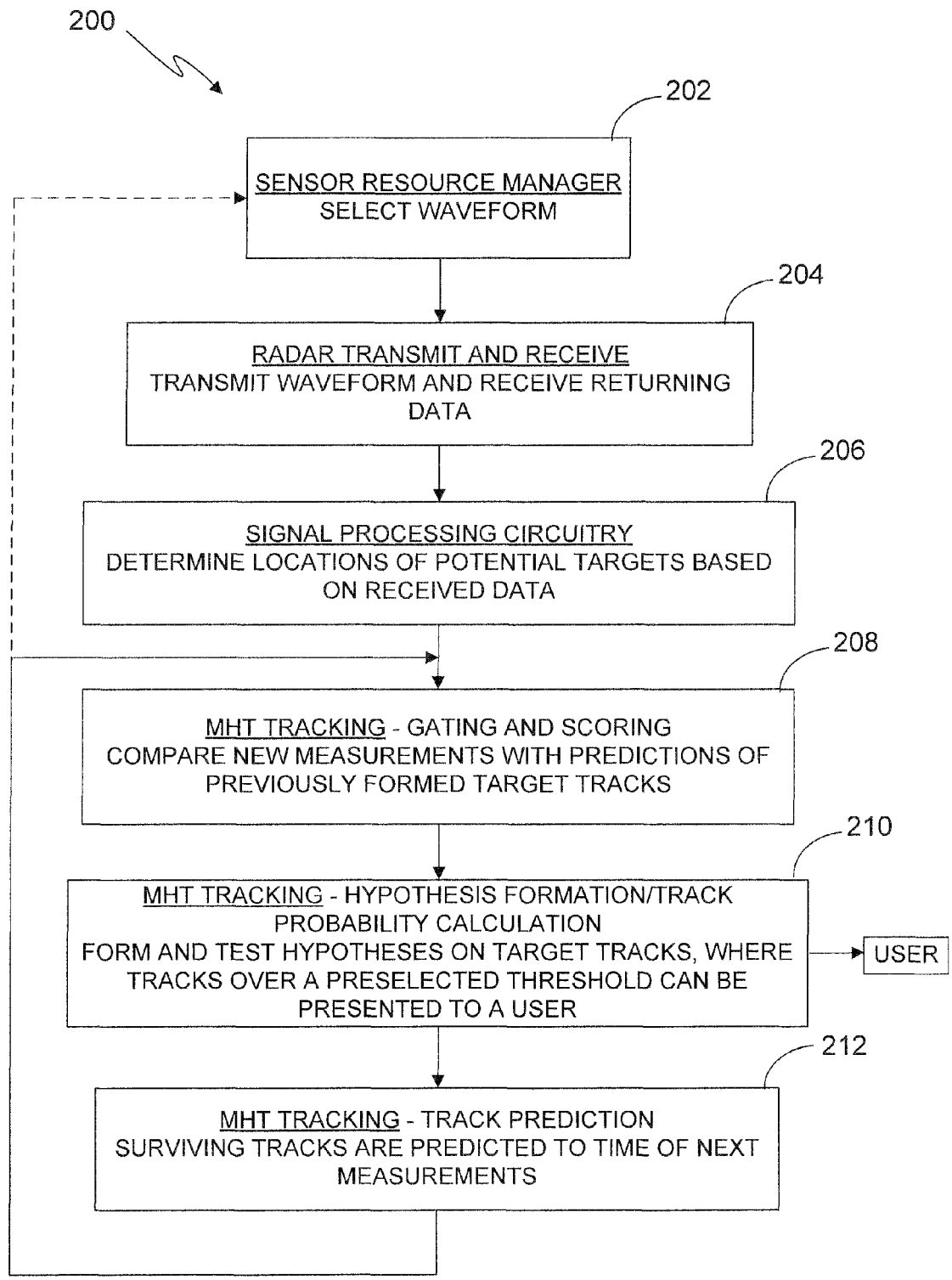
FIG. 2 is a flowchart of a process for resolving radar ambiguities using multiple hypothesis tracking in accordance with one embodiment of the invention.

FIG. 2 is a flowchart of a process 200 for resolving radar ambiguities using multiple hypothesis tracking in accordance with one embodiment of the invention. In particular embodiments, the process 200 can be used in conjunction with the radar system of FIG. 1. The process first selects (202) a waveform at a sensor resource manager. The process then transmits (204) the selected waveform and receives returning data using radar transmit and receive circuitry. This returned data includes information from both true targets as well as extraneous objects such as clutter (e.g., false targets). The process then determines (206) the locations of potential targets based on the received data using signal processing circuitry. The process compares (208) the new location measurements with predictions of previously formed target tracks using gating and scoring functions associated with MHT tracking circuitry.

The process then forms and tests (210) hypotheses on target tracks using hypothesis formation and track probability calculations associated with the MHT tracking circuitry. In forming and testing the hypotheses, all tracks that were initiated or updated by measurements that are in the same ambiguity set can be defined to be incompatible. Then, hypotheses can be formed by collecting compatible tracks into hypotheses and computing the probabilities of those hypotheses. Track probabilities are then computed from the hypothesis probabilities. Tracks whose probabilities fall below a deletion threshold can be deleted, and, subject to further tests that are required to maintain computational feasibility, the remaining tracks are propagated to the next dwell. Since incompatible tracks cannot be contained in the same hypothesis, the members of ambiguity sets will, in effect, be competing for probability. Then, eventually at most one member of an ambiguity set will be contained in any track that is continued. Once the ambiguity is resolved and a track passes a confirmation probability threshold, the track can be presented to the user.

The process then predicts (212) the surviving tracks to the time of the next measurements using a track prediction function provided by the MHT tracking circuitry. This will generally include both tracks that are resolved and those that need further data for resolution. These predicted tracks can then be compared (208) with the next set of measurement data and the process continues. These predicted tracks may also be used by the sensor manager to point the sensor to the most likely target positions and to choose the waveform (202) that will most likely produce target detections and best resolve current ambiguities.

Blocks 208 to 212 illustrate one implementation of MHT. However, other suitable MHT processes can be used as well. For example, another suitable MHT process is described in U.S. Pat. No. 5,414,643, the entire content of which is hereby incorporated by reference. Another suitable MHT process is described in an article entitled, "Multiple Hypothesis Tracking For Multiple Target Tracking", by Samuel Blackman, published January 2004 in IEEE A&E Systems Magazine, Vol. 19, No. 1, the entire content of which is hereby incorporated by reference. In other embodiments, other suitable implementations of MHT can be used.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 3:
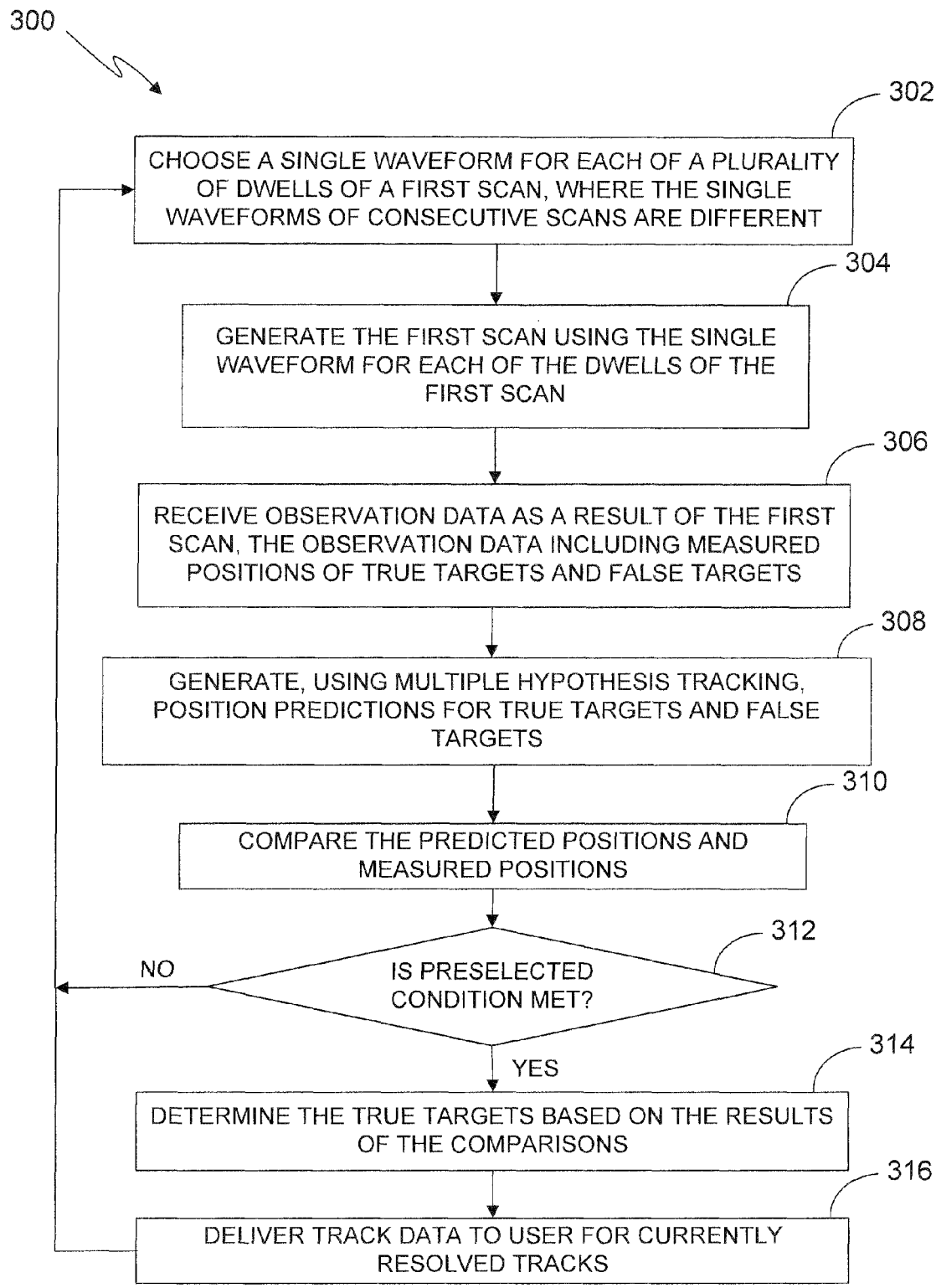
FIG. 3 is a flowchart of another process for resolving radar ambiguities using multiple hypothesis tracking in accordance with one embodiment of the invention.

FIG. 3 is a flowchart of a process 300 for resolving radar ambiguities using multiple hypothesis tracking in accordance with one embodiment of the invention. In particular embodiments, the process 300 can be used in conjunction with the radar system of FIG. 1. The process first chooses (302) a single waveform for each of a plurality of dwells of a first scan, where the single waveforms of consecutive scans are different. The same waveform is used for all dwells on a given scan but the waveforms are changed from scan-to-scan, typically using a predetermined schedule. In several embodiments, the process uses a set of preselected waveforms and then cycles through the set of preselected waveforms in a calculated manner. The process then generates (304) the first scan using the single waveform for each of the dwells of the first scan. The process then receives (306) observation data as a result of the first scan, the observation data including measured positions of true targets and false targets.

The process generates (308), using multiple hypothesis tracking, position predictions for true targets and false targets. The process then compares (310) the predicted positions and measured positions. The process then determines (312) whether a preselected process condition is met. In one embodiment, for example, the preselected process condition tests whether the predicted position is within a preselected distance of the measured position. If so, the process then determines (314) the true targets based on the results of the comparisons. If the preselected process condition is not met, the process returns to choosing (302) a single waveform for each of a plurality of dwells of a scan. After the process determines the true targets based on the results of the comparisons (e.g., through target resolution), the process delivers (316) the target data to a user for currently resolved tracks and then returns to block 302 to choose a preselected waveform again. In some embodiments, the process skips block 316 and returns to block 302 after block 314.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A method for resolving radar ambiguity using multiple hypothesis tracking, the method comprising:
    (a) choosing a single waveform for each of a plurality of dwells of a first scan, wherein the single waveforms of consecutive scans are different;
    (b) generating the first scan using the single waveform for each of the dwells of the first scan;
    (c) receiving observation data as a result of the first scan, the observation data comprising measured positions of true targets and false targets;
    (d) generating, using multiple hypothesis tracking, position predictions for true targets and false targets;
    (e) comparing the predicted positions and measured positions;
    repeating (a)-(e) until a preselected process condition is met; and
    determining the true targets based on the results of the comparisons.

2. The method of claim 1, wherein the predicted positions form tracks, the method further comprising defining all tracks to be incompatible.

3. The method of claim 1, wherein the predicted positions form tracks, the method further comprising declaring at most a single track to represent a true target.

4. The method of claim 1, further comprising identifying a set of measured positions that represent a single target.

5. The method of claim 4, further comprising determining a probability for the single target.

6. The method of claim 1, further comprising:
    identifying a set of measured positions that represent a single target for a plurality of targets;
    deleting a track having a computed probability less than a preselected deletion threshold.

7. The method of claim 1, further comprising providing track data to a user for resolved tracks of the true targets and the false targets.

8. The method of claim 1, wherein the choosing the single waveform for each of the plurality of dwells of the first scan comprises choosing the single waveform based on the position predictions.

9. The method of claim 8, wherein the choosing the single waveform comprises choosing the single waveform based on currently unresolved ambiguities in the true targets and false targets.

* * * * *